US009162182B2

(12) United States Patent
Gruber

(10) Patent No.: US 9,162,182 B2
(45) Date of Patent: Oct. 20, 2015

(54) CATALYTIC CONVERTER ARRANGEMENT FOR AN EXHAUST-GAS CLEANING DEVICE OF AN INTERNAL COMBUSTION ENGINE

(71) Applicant: GE Jenbacher GmbH & Co OG, Jenbach (AT)

(72) Inventor: Friedrich Gruber, Hippach (AT)

(73) Assignee: GE JENBACHER GMBH & CO OG, Jenbach (AT)

(*) Notice: Subject to any disclaimer, the term of this patent is extended or adjusted under 35 U.S.C. 154(b) by 39 days.

(21) Appl. No.: 13/950,537

(22) Filed: Jul. 25, 2013

(65) Prior Publication Data

US 2013/0309142 A1 Nov. 21, 2013

Related U.S. Application Data

(63) Continuation of application No. PCT/AT2011/000521, filed on Dec. 30, 2011.

(30) Foreign Application Priority Data

Jan. 27, 2011 (AT) .................................... 114/2011

(51) Int. Cl.
*F01N 3/00* (2006.01)
*B01D 53/94* (2006.01)
(Continued)

(52) U.S. Cl.
CPC .............. *B01D 53/94* (2013.01); *F01N 3/2006* (2013.01); *F01N 3/2046* (2013.01); *F01N 13/017* (2014.06); *F01N 2260/02* (2013.01); *F01N 2590/10* (2013.01); *Y02T 10/26* (2013.01)

(58) Field of Classification Search
CPC ..... A47F 3/0413; A47F 3/043; F01N 3/2006; F01N 3/2046; F01N 13/017; F01N 2260/02; F01N 2590/10; B01D 53/94; F25D 17/06; F25D 21/04; F25D 2317/062; F25D 23/028; Y02T 10/26

See application file for complete search history.

(56) References Cited

U.S. PATENT DOCUMENTS 3,166,895 A * 1/1965 Scheffler et al. ................. 60/299
3,180,712 A * 4/1965 Hamblin ....................... 422/171
(Continued)

FOREIGN PATENT DOCUMENTS

DE 100 46 278 3/2002
EP 0 881 366 12/1998
(Continued)

OTHER PUBLICATIONS

International Search Report (ISR) issued May 2, 2012 in International (PCT) Application No. PCT/AT2011/000521.

*Primary Examiner* — Jesse Bogue
(74) *Attorney, Agent, or Firm* — Wenderoth, Lind & Ponack, L.L.P.

(57) ABSTRACT

An exhaust-gas cleaning device for an internal combustion engine has a catalytic converter arrangement. The catalytic converter arrangement includes, along the flow direction, a plurality of catalytically active regions which are, in particular, independent of one another. A heat dissipation device includes a heat absorbing device and one heat sink. The heat absorbing device is provided between at least two catalytically active regions. The heat absorbing device is connected to the heat sink. The exhaust-gas cleaning device includes a plurality of catalytic converter arrangements, an, in particular tubular, inner housing with a housing cover, and an outer housing which encloses the inner housing. The inner housing has a longitudinal axis, and the catalytic converter arrangements are arranged separately from one another on the housing cover of the inner housing.

19 Claims, 9 Drawing Sheets

(51) Int. Cl.
*F01N 3/20* (2006.01)
*F01N 13/00* (2010.01)

(56) References Cited

U.S. PATENT DOCUMENTS

| | | | |
|---|---|---|---|
| 3,733,181 A * | 5/1973 | Tourtellotte | 422/171 |
| 3,736,105 A * | 5/1973 | Tourtellotte | 422/171 |
| 3,790,350 A * | 2/1974 | Haensel | 422/222 |
| 3,953,176 A * | 4/1976 | Santala et al. | 422/171 |
| 4,023,360 A * | 5/1977 | Wossner et al. | 60/277 |
| 4,900,517 A * | 2/1990 | Domesle et al. | 422/171 |
| 5,328,774 A | 7/1994 | Maus et al. | |
| 5,423,904 A * | 6/1995 | Dasgupta | 96/146 |
| 5,474,745 A | 12/1995 | Fukui et al. | |
| 5,484,575 A * | 1/1996 | Steenackers | 422/176 |
| 5,625,245 A * | 4/1997 | Bass | 310/306 |
| 5,934,073 A | 8/1999 | Gieshoff et al. | |
| 6,347,511 B1 | 2/2002 | Haines | |
| 6,444,177 B1 * | 9/2002 | Muller et al. | 422/177 |
| 6,680,037 B1 * | 1/2004 | Allansson et al. | 423/215.5 |
| 7,341,699 B2 * | 3/2008 | Thieman et al. | 422/177 |
| 8,800,263 B2 * | 8/2014 | Eder et al. | 60/275 |
| 2004/0216448 A1 * | 11/2004 | Brillant et al. | 60/274 |
| 2005/0172993 A1 * | 8/2005 | Shimoji et al. | 136/208 |
| 2005/0217714 A1 * | 10/2005 | Nishijima et al. | 136/204 |
| 2010/0011738 A1 | 1/2010 | Zhang | |
| 2010/0146954 A1 * | 6/2010 | Sloss et al. | 60/320 |

FOREIGN PATENT DOCUMENTS

| | | |
|---|---|---|
| EP | 1 111 212 | 6/2001 |
| EP | 2 146 075 | 1/2010 |
| JP | 2008-223758 | 9/2008 |

* cited by examiner

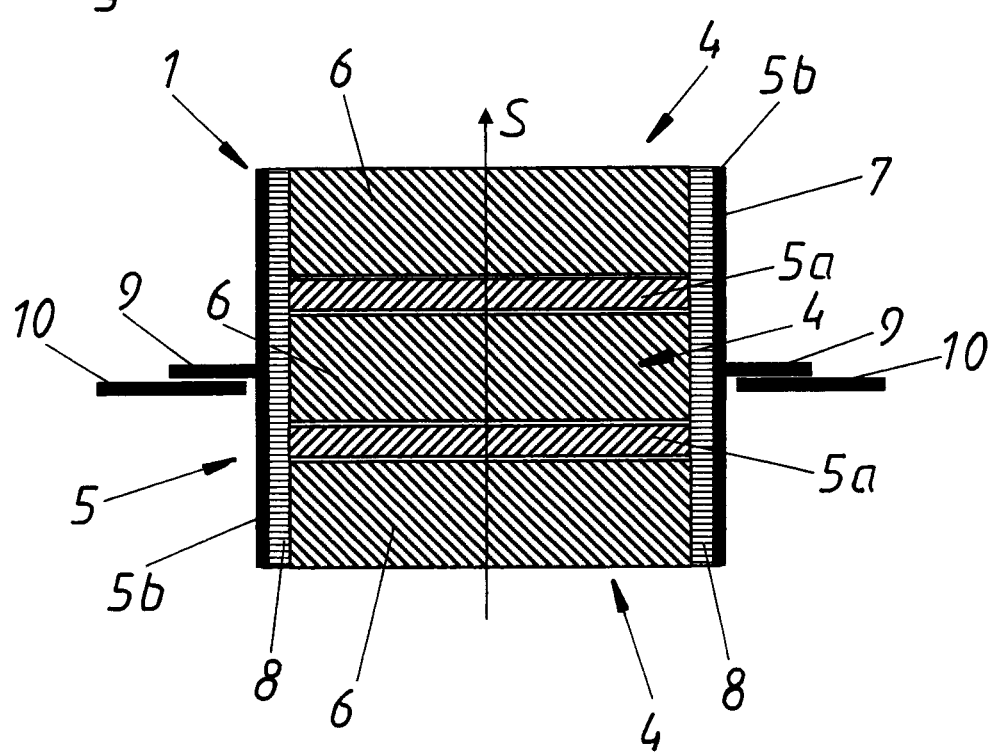

CATALYTIC CONVERTER ARRANGEMENT FOR AN EXHAUST-GAS CLEANING DEVICE OF AN INTERNAL COMBUSTION ENGINE

BACKGROUND OF THE INVENTION

1. Field of the Invention

The invention relates to an exhaust-gas cleaning device for an internal combustion engine, in particular for a stationary gas engine, with at least one catalytic converter arrangement, wherein exhaust gas from the internal combustion engine can flow in a flow direction through the catalytic converter arrangement, and comprises, along the flow direction, a plurality of catalytically active regions that are in particular independent of one another, wherein a heat dissipation device is provided which comprises at least one heat absorbing device and a heat sink, wherein the at least one heat absorbing device is provided between at least two catalytically active regions, the at least one heat absorbing device being in contact with the heat sink.

2. Description of Related Art

Modern high-performance lean burn engines, in particular stationary gas engines, have very high power densities and efficiencies with relatively low manufacturing and maintenance costs. For this reason lean gas engine units are among the most economical energy generation technologies on the market. Compared to diesel engines the emissions of pollutants and toxic substances is also very low, in which connection NOx emissions can be reduced to very low values by internal engine measures and CO and formaldehyde emissions by exhaust gas catalytic measures. Natural gas-operated lean engines on the other hand have relatively high emission values in terms of unburned hydrocarbons, in particular methane ($CH_4$). In contrast to CO, conventional exhaust gas cleaning devices can convert only very small amounts of $CH_4$. In order to achieve sufficiently high conversion rates, in addition to special formulations for the active surface of the catalytic converter arrangements of exhaust gas cleaning devices temperatures of at least about 600° C. are also necessary.

Since the exhaust gas temperature of modern highly supercharged lean burn gas engines after an exhaust gas turbocharger is only about 300-400° C., an exhaust gas cleaning device that is effective for $CH_4$ cannot be used after the exhaust gas turbocharger. In order to achieve a corresponding reaction for the conversion of unburned hydrocarbons in an exhaust gas cleaning device of a highly supercharged lean burn gas engine, the exhaust gas cleaning device must therefore be arranged in front of an exhaust gas turbine. In this way it can be ensured that the temperature necessary for this chemical reaction is achieved.

In the conversion of the unburned hydrocarbons part of the chemical energy contained therein is converted by the chemical reaction into heat. Since the reaction rate in the exhaust gas cleaning device is a function of the temperature, the conversion takes place more rapidly and completely the higher the temperature. Therefore as soon as the concentration of unburned hydrocarbons exceeds a certain value, the rise in temperature on account of the reaction leads to an increase in the reaction rate and thus to a self-sustaining process. The temperature continues to increase until all the unburned hydrocarbons contained in the exhaust gas are completely converted in a very short stretch. With correspondingly increased concentrations of unburned hydrocarbons there is consequently a localized thermal overloading of the catalyst support or the carrier material of the catalytic converter arrangements even melts. This effect is further intensified in the case where the exhaust gas cleaning device is installed in front of an exhaust gas turbine, since the exhaust gas is under a pressure of about 3-4 bars and the energy density of the chemical energy contained in the unburned hydrocarbons is therefore correspondingly increased. One of the most serious problems in this connection is the thermal destruction of regions of an exhaust gas cleaning device due to too high concentrations of unburned hydrocarbons, such as occur for example with ignition failures or misfiring. In principle however it is virtually impossible to avoid ignition failures in gas engines.

As a countermeasure against such an intensified corrosion of a catalyst support body on account of highly exothermic reactions caused by unburned hydrocarbons, DE 100 46 278 A1 for example shows a catalyst support body that has two different zones in the flow direction of the exhaust gas, wherein the first zone has a higher surface specific heat capacity than the second zone. In this way a relatively large amount of thermal energy is extracted from the exhaust gas in the first zone, whereby an intensified corrosion in the second zone can be counteracted. The disadvantage in this case however is that the heat absorption takes place through the catalyst support body itself. Since the heat capacity and the thermal conductivity of the catalyst support body are limited, there is therefore only a slight dissipation of the generated heat from the catalytic converter arrangement to the surrounding structure.

Exhaust gas cleaning devices with respectively a catalytic converter arrangement are also known from U.S. Pat. No. 5,474,745 A and EP 1 111 212 A2, which comprise cooling devices for dissipating heat from the catalytic converter arrangement.

BRIEF SUMMARY OF THE INVENTION

The object of the invention is to provide an improved exhaust gas cleaning device compared to the prior art for an internal combustion engine. In particular an exhaust gas cleaning device for reducing uncombusted fuel components should be provided, which avoids the aforementioned problems associated with highly exothermic processes. The exhaust gas cleaning device should therefore have in particular a high tolerance to short-term hydrocarbon peaks, which can occur for example due to ignition failures or interruptions in the fuel combustion in the engine, e.g. due to targeted selective cylinder deactivation with load shedding. In addition the maintenance of the exhaust gas cleaning device should be facilitated.

This object is achieved according to the invention in that the exhaust gas cleaning device comprises a plurality of catalytic converter arrangements and an in particular tubular inner housing with a housing cover and also an outer housing surrounding the inner housing, the inner housing having a longitudinal axis, wherein the catalytic converter arrangements are disposed separately from one another on the housing cover of the inner housing.

Due to the fact that the catalytic converter arrangements are disposed on the inner housing, an as direct as possible heat dissipation can take place from the catalytic converter arrangements to the inner housing of the exhaust gas cleaning device. More generally, the proposed heat dissipation devices in the catalytic converter arrangements comprising at least one heat absorbing device and a heat sink as well as the inner housing constitute heat capacities. Due to these heat capacities a temperature stabilization of the exhaust gas cleaning device can in general be achieved, especially if the heat absorbing devices, the heat sinks (e.g. the housings of the catalytic converter arrangements) and the inner housing of the exhaust gas cleaning device are in good thermally-conducting contact with one another. Due to the proposed arrangement of a plurality of catalytic converter arrangements on the inner housing of an exhaust gas cleaning device heat can be dissipated in a targeted and efficient manner from the catalytic converter arrangements to the inner housing. Due to the fact that a plurality of catalytic converter arrangements are arranged separately from one another on the inner housing, substantially free regions of the inner housing can be arranged between the catalytic converter arrangements. These webs between the catalytic converter arrangements likewise have a temperature-stabilizing effect in the sense of a heat capacity. They can also promote the heat dissipation. Accordingly the internal structure of the catalytic converter arrangements with heat dissipation devices and the arrangement of the catalytic converter arrangements on the inner housing of an exhaust gas cleaning device produce an advantageous synergistic effect in relation to the temperature stabilization and temperature compensation, in particular the heat dissipation, of the exhaust gas cleaning device.

The catalytic converter arrangements can preferably be arranged in such a way that their flow direction extends substantially transversely to the longitudinal axis of the inner housing, so that, viewed from the housing, the exhaust gas can flow radially through the catalytic converter arrangements. Due to such an arrangement of the catalytic converter arrangements along the longitudinal axis of the inner housing the flow velocity in the exhaust gas cleaning device and thus the flow of uncombusted exhaust gas components on to the surfaces of the catalytically active regions can be significantly reduced while maintaining a constant space velocity. In addition the overall catalyst volume can thereby be divided into a plurality of individual catalytic converter arrangements, each having a relatively small diameter.

In order to indicate the specific exhaust gas performance of an exhaust gas cleaning device the exhaust gas throughput through the exhaust gas cleaning device is normally referred to the overall volume of the catalytically active regions and is termed the space velocity. Normally the space velocity of exhaust gas cleaning devices is between 40,000 and 100,000 $h^{-1}$, i.e. an exhaust gas amount corresponding to 40,000 to 100,000 times the total volume of the catalytically active regions flows per hour through the exhaust gas cleaning device. These values for the space velocity correspond to values for the flow velocity of ca. 3-7 m/sec. referred to the free inlet area of the catalytically active regions. Corresponding to the flow velocity the exhaust gas supplies the chemical energy contained in the unburned hydrocarbons, a part of which is converted by the chemical reaction into heat and introduced into the carrier bodies of the catalytic converter arrangements of the exhaust gas cleaning device.

The sum of the inlet areas of the catalytic converter arrangements can in this connection be in a defined ratio to the exhaust gas volume flow (referred to the rated output of the engine) corresponding to the required space velocity, according to the formula $$A = \frac{Q}{(v \cdot l)}$$

wherein A corresponds to the sum of the inlet areas of the catalytic converter arrangements, Q to the exhaust gas volume flow, v to the required space velocity, and l to the total length of the catalytically active regions. According to this formula a required total sum of the inlet areas of the catalytic converter arrangements of 0.25 $m^2$ is obtained for example for an exhaust gas volume flow of 1,000 $m^3/h$, a space velocity of 40,000 $h^{-1}$ and a total length of the catalytically active regions of an exhaust gas cleaning device of 0.1 m.

An edged, preferably at least 3 mm thick heat-resistant steel sheet for example, whose cross-section can be polygonal crosswise to the longitudinal axis, can be used as inner housing of the exhaust gas cleaning device. Thus, for example, an octagonal cross-section of the housing cover of the inner housing results in eight lateral surfaces extending in the direction of the longitudinal axis of the inner housing, wherein catalytic converter arrangements can be arranged on each lateral surface in the direction of the longitudinal axis. The number of lateral surfaces can in this connection be chosen depending on the exhaust gas volume flow through the exhaust gas cleaning device. Thus, the cross-section of the housing cover of the inner housing may for example be a square cross-section up to 2,000 $m^2/h$, a hexagonal cross-section in the region of 1,500 to 5,000 $m^3/h$, an octagonal cross-section in the region of 4,000 to 12,000 $m^3/h$, and a dodecagonal cross-section in the region >12,000 $m^3/h$.

Furthermore, with a proposed exhaust gas cleaning device it may be envisaged that the inner housing has an exhaust gas inlet opening, wherein the plurality of catalytic converter arrangements starting from the exhaust gas inlet opening is arranged along the longitudinal axis in ever decreasing radial distances from the longitudinal axis. In this connection, starting from the exhaust gas inlet opening the clear diameter of the inner housing decreases along the longitudinal axis. This can be achieved for example if the housing cover of the inner housing has a plurality of sections of different cross-sectional diameters. Alternatively or in addition to the housing cover with different diameters, the catalytic converter arrangements can also be arranged on the inner housing at different radial distances from the longitudinal axis of the latter. Due to such an arrangement of the catalytic converter arrangements the exhaust gas flowing in through the exhaust gas inlet opening can be uniformly distributed over the catalytic converter arrangements, especially with relatively large axial dimensions of the inner housing.

Furthermore a heating device can be provided for heating the catalytically active regions of at least one of the plurality of catalytic converter arrangements. Preferably a heating device can be arranged in each case between respectively two catalytic converter arrangements arranged along the direction of the longitudinal axis. The heating devices serve in particular during a cold start of the internal combustion engine to achieve a rapid rise in temperature of the exhaust gas cleaning device, in order to be able to effect a rapid catalytic activity of the exhaust gas cleaning device. The heating devices can for example be heated wires. Alternatively or in addition the at least one heat absorbing device can also be used for heating purposes.

Due to the proposed heat dissipation device of a catalytic converter arrangement, in particular heat that is produced in the conversion of uncombusted hydrocarbon fractions in the catalytic converter arrangement will be able to be dissipated. The preferably two to four catalytically active regions of a catalytic converter arrangement can be independent of one another. A heat absorbing device is provided between at least two catalytically active regions, which can absorb the produced heat and appropriately dissipate it by thermal contact with a heat sink. The heat sink can in this connection preferably be formed by a housing that surrounds the catalytic converter arrangement and to which the at least one heat absorbing device is thermally contacted or connected. According to an advantageous development a good thermally conducting heat transporting device, preferably a metal fiber mat or an embedded mass, can be provided in this connection between the catalytic converter arrangement and the housing.

A preferred embodiment of the invention envisages that the plurality of catalytically active regions comprise in each case a carrier body, wherein at least one catalyst, preferably a plurality of catalysts, is applied to the carrier body. In this connection noble metals such as platinum, palladium and rhodium are frequently used as catalysts. It may preferably be envisaged that the catalytic converter arrangement has in the flow direction a first catalytically active region and a second catalytically active region, wherein the carrier body of the first catalytically active region has a lower catalyst loading than the carrier body of the second catalytically active region.

In a further embodiment of the invention this can be implemented so that in each case a heat absorbing device is provided respectively between two successive catalytically active regions in the flow direction. In this case it may of course also be envisaged that respectively a heat absorbing device is provided in the flow direction before the first and after the last catalytically active region.

With conventional catalytic converter arrangements the carrier bodies are normally pressed into the housing by means of ceramic absorbent mats (e.g. of mica compounds). These absorbent mats have the task of compensating for the different thermal expansions of the carrier body and housing, as well as thermally insulating the catalytic converter arrangement. In this way as little heat as possible should therefore be dissipated from the interior of the catalytic converter arrangement to the housing surrounding the catalytic converter arrangement. With the proposed catalytic converter arrangement exactly the opposite however should be achieved: in order to be able to counteract the large evolution of heat due to the conversion of unburned hydrocarbons, as much heat as possible should be dissipated. For this, heat absorbing devices are provided in the interior of the catalytic converter arrangement, which dissipate the produced heat preferably by means of a good thermally conducting heat transporting device (e.g. a metal fiber mat or embedded mass with a high thermal conductivity) to a heat sink, for example the housing surrounding the catalytic converter arrangement. Such a good thermally conducting heat transporting device has a—temperature-stabilizing effect, so that a thermal relief of the catalytic converter arrangement can be possible in the case of briefly occurring temperature peaks. The housing can in this connection preferably surround in the manner of a cover the catalytic converter arrangement in the flow direction of the exhaust gas.

According to a particularly preferred embodiment it may be envisaged that the carrier body is a ceramic carrier. The ceramic material of the carrier body can in this connection include for example cordierite. The carrier body can be formed from a disk having a thickness of 40-60 mm, preferably 50 mm. In the case of circular disks the diameter of the disk can be 120-160 mm, preferably 140 mm. The wall thickness of the carrier can be >0.25 mm, preferably at least 0.3 mm, in order to ensure an increased heat capacity of the carrier.

In a particularly preferred embodiment of the invention it may be envisaged that the at least one heat absorbing device consists at least partly of a material having a good thermal conductivity and/or that the at least one heat absorbing device consists at least partly of a material with a high heat capacity. A material having a good thermal conductivity is understood in the context of the invention to be a material with a thermal conductivity >10 W/mK, preferably >20 W/mK. This applies for example to certain brass alloys or copper-nickel alloys, for example to the alloy $CuNi_2Si$ (SB22) with a thermal conductivity of around 250 W/mK. A material with a high heat capacity is understood in the context of the invention to be a material having a specific heat capacity >0.4 kJ/kgK.

In general however an uncoated carrier body can also be used as heat absorbing device, wherein in this case preferably the cell wall thickness is chosen to be higher in order to achieve a larger heat capacity.

That embodiment of the invention is particularly advantageous in which the at least one heat absorbing device comprises at least one wire mesh layer. A wire mesh layer can in this connection be formed from substantially straight, crosswise-arranged rods or wires with preferably in each case a diameter of ca. 1.5-2.5 mm. The preferred materials for the rods or wires are steel (low-alloy steels), brass, nickel, alloys or special ceramics with a good thermal conductivity and at the same time a high heat capacity.

Preferably 4-7 wire mesh layers can be used per heat absorbing device. The distance between the individual rods or wires within a plane and wire mesh layer can in this connection be ca. 1.5-2.5 mm. The wire mesh layers can be enclosed in flexible holders or clamps, but do not have to be tightly packed. The at least one heat absorbing device can also include a plurality of wire mesh layers arranged in an overlapping manner and superimposed or displaced relative to one another, and having an overall layer thickness of ca. 5-15 mm in the flow direction.

In an advantageous embodiment of the invention, a fine matching of the wire interspacing and number of wire mesh layers can be carried out so that with a flow velocity of the exhaust gas in relation to the free flow surface of ca. 1 m/sec, a pressure loss of 4-7 mbar is established. Apart from the heat dissipation the at least one heat absorbing device can in this way contribute to a homogenization of the flow over the cross-section, referred to the flow direction of the exhaust gas. By means of a corresponding arrangement of the at least one wire mesh layer an increased turbulence in the exhaust gas flow can however also be generated, by means of which the reactivity of the exhaust gas in the next catalytically active region in the flow direction can be increased.

It may preferably be envisaged that the at least one heat absorbing device includes a metal foam or ceramic foam. A metal or ceramic foam can have a particularly favorable effect on a flow homogenization and a heat distribution and temperature stabilization. The employed metal or ceramic foam is preferably characterized in this connection by a large specific surface, a high thermal conductivity, a large heat capacity, and also a high temperature and corrosion resistance. The at least one heat absorbing device can also be formed as a sponge or as a hollow spherical structure.

In order to intensify the heat dissipation effect of the heat dissipation device, a cooling device for the active cooling of the at least one heat absorbing device may furthermore be provided.

At least one heating device can be provided for preheating the plurality of catalytically active regions, for example in the case of a cold start of the internal combustion engine. This can be implemented for example as a heating mat and can be arranged in the flow direction after a heat absorbing device and before a catalytically active region. Such a heating device serves in particular in the case of a cold start of the internal combustion engine to achieve a stable temperature state in the catalytic converter arrangement.

It has proved particularly advantageous if the housing of the catalytic converter arrangement comprises at least one fastening device for fastening the catalytic converter arrangement to a housing part of an exhaust gas cleaning device. The fastening devices can in this connection be implemented for example as a plurality of holding elements (e.g. fixing rings) projecting from the preferably cover-shaped housing, via which the catalytic converter arrangement can for example be screwed to the inner housing of an exhaust gas cleaning device. If the housing of the catalytic converter arrangement as well as the inner housing of the exhaust gas cleaning device consist of a good thermally conducting material (for example sheet steel), then a good heat dissipation can be achieved starting from the at least one heat absorbing device through for example a good thermally conducting heat transporting device (e.g. embedded mass) up to the housing of the catalytic converter arrangement and to the inner housing of the exhaust gas cleaning device, which in this case form the heat sink.

BRIEF DESCRIPTION OF THE DRAWINGS

Further details and advantages of the present invention are described hereinafter with the aid of the description of the figures and with reference to the exemplary embodiments illustrated in the drawings, in which.

DETAILED DESCRIPTION OF THE INVENTION

Figure 1A:
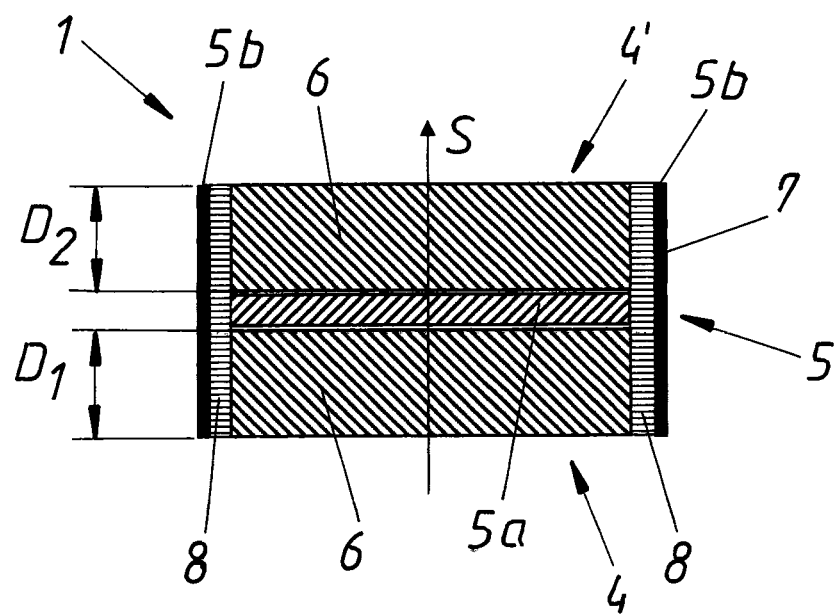
FIG. 1a is an example of the proposed catalytic converter arrangement in a sectional view along the flow direction.

FIG. 1a shows a sectional view along the flow direction S of an embodiment of a proposed catalytic converter arrangement 1. The catalytic converter arrangement 1 comprises two catalytically active regions 4, 4', which respectively include a carrier body 6. The carrier body 6 of the first catalytically active region 4 in the flow direction S has in this connection a smaller catalyst loading than the carrier body 6 of the second catalytically active region 4' in the flow direction S. As a result the first catalytically active region 4 in the flow direction S has a lower catalytic activity compared to the second catalytically active region 4', whereby the conversion of the unburned fuel components can take place over the whole catalyst length. The carrier bodies 6 of the two catalytically active regions 4, 4' can in this connection be for example circular ceramic matrix disks with disk thicknesses D1, D2 of ca. 45 mm and diameters of ca. 140 mm.

The wall thickness of the ceramic matrix can in this connection be ca. 0.3 mm, in order correspondingly to increase the heat capacity of the ceramic matrix and the thermal resistance in response to a rapid rise in temperature. A heat absorbing device 5a is arranged between the two carrier bodies 6 of the catalytically active regions 4, 4', wherein this heat absorbing device 5a preferably includes a material having a good thermal conductivity and/or high heat capacity in order to be able correspondingly to dissipate and/or absorb occurring temperature peaks. The heat absorbing device 5a can for example consist of one or more wire mesh layers, wherein the mesh rods can in each case have diameters of about 1.5 to 2.5 mm. The wire mesh layers can have a temperature-stabilizing effect and, depending on the arrangement, also a turbulence-generating effect. An enhanced reaction in the catalytically active region 4' following in the flow direction S can be achieved by increased turbulence in the exhaust gas flow.

The illustrated arrangement of two catalytically active regions 4, 4' and a heat absorbing device 5a arranged there between is embedded by means of a good thermally conducting heat transporting device 8 in a cover-shaped housing 7, which acts as a heat sink 5b. The heat transporting device 8 can in this connection for example be a metal fiber mat, which can dissipate the heat of the carrier bodies 6 and the heat absorbing device 5a in the direction of the housing 7, which can be formed for example as a sheet steel cylindrical cover.

Figure 1B:
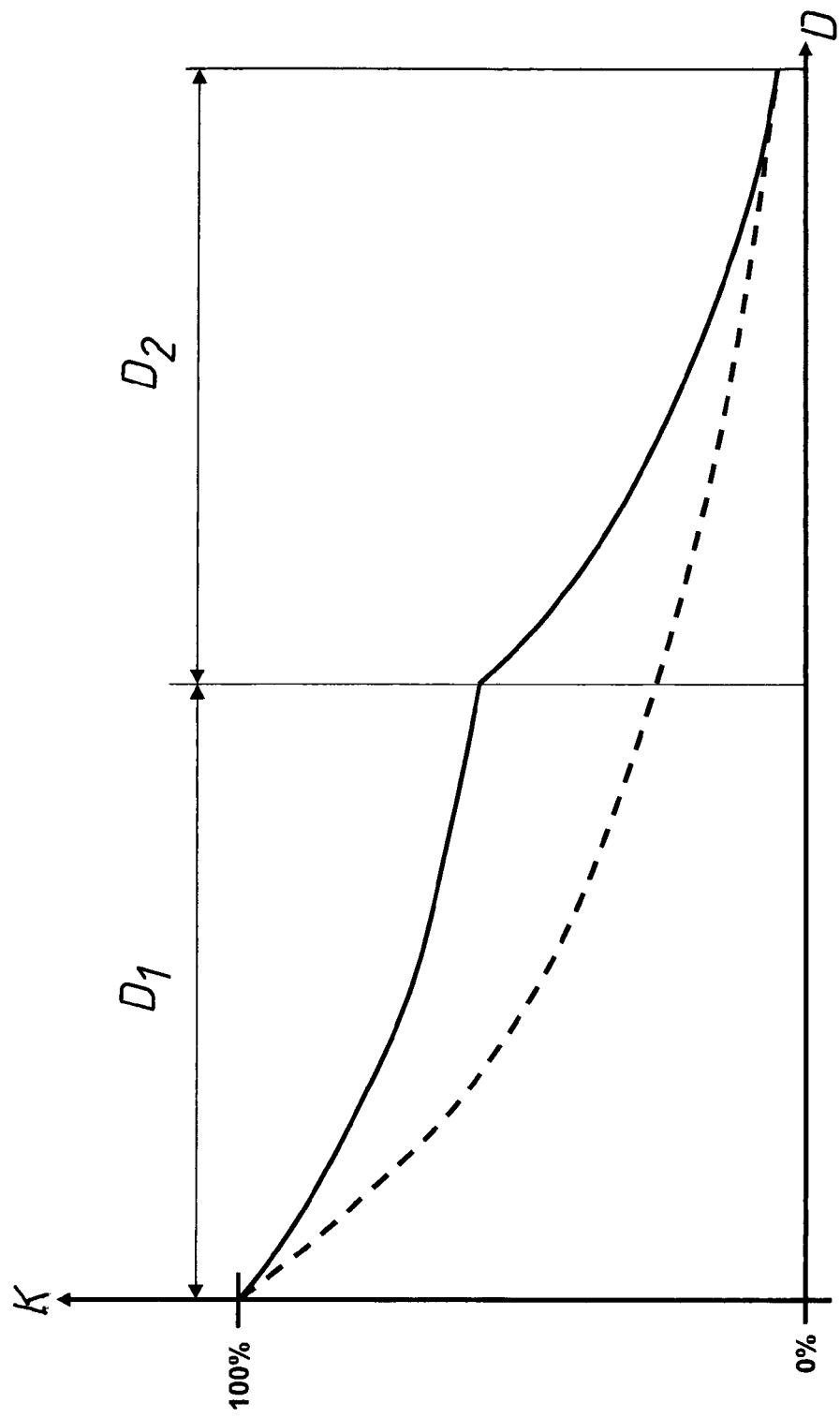
FIG. 1b is a diagram showing the concentration of unburned hydrocarbons along the catalytically active regions of a catalytic converter arrangement according to FIG. 1a, FIG. 2 is a further example of a proposed catalytic converter arrangement in a sectional view along the flow direction.

FIG. 1b shows a diagram of the concentration K of unburned hydrocarbon fractions contained in the exhaust gas flow over the thickness D of the catalytically active regions 4, 4' according to FIG. 1a through which the exhaust gas flows in the flow direction S. The X-axis of this diagram shows the layer thicknesses D1, D2 of the two catalytically active regions 4, 4' of the arrangement according to FIG. 1a, through which exhaust gas flows in the flow direction S. The Y-axis shows the concentration K of the unburned hydrocarbons in the exhaust gas stream. The concentration K at the inlet to the first catalytically active region 4 is taken in this connection as reference value. This reference value is 100%. A decrease in the concentration K occurs along the disc thickness D1 of the first catalytically active region 4 corresponding to the loading with catalysts. The second catalytically active region 4' has, compared to the first catalytically active region 4, a higher loading with catalysts, as a result of which this second catalytically active region 4' has a higher catalytic activity and the concentration K of unburned hydrocarbons in the exhaust gas stream decreases correspondingly more rapidly. By means of such a non-uniform loading with catalysts the conversion of the unburned hydrocarbons is better distributed over the relevant catalytically active regions 4, 4'. This will avoid the majority of the unburned hydrocarbons being already converted in the first catalytically active region 4 in the flow direction S, since the heat front in any case migrates against the flow direction S. In other words, this will ensure that still unburned hydrocarbons are also converted in catalytically active regions 4' following the first catalytically active region 4 in the flow direction S. It may however also be envisaged of course that both catalytically active regions 4, 4' have the same catalyst loading. This case is shown by the dashed curve in the diagram.

FIG. 2 shows a further embodiment of the proposed catalytic converter arrangement 1 in a sectional view along the flow direction S. In this example the catalytic converter arrangement 1 has a total of three catalytically active regions 4, wherein a heat absorbing device 5a is provided in each case between two successive catalytically active regions 4 in the flow direction S. The whole arrangement is embedded by means of a good thermally conducting embedding composition, which forms a heat transporting device 8, in a cylindrical cover-shaped housing 7, the housing 7 forming a heat sink 5b. The housing 7 can for example consist of sheet steel and in this embodiment comprises two fastening devices 9 by means of which the catalytic converter arrangement 1 can be fastened, for example by screws, to an inner housing 10 of an exhaust gas cleaning device 2. The catalytic converter arrangement 1 can be serviced particularly easily (e.g. cleaned or replaced) by a releasable fastening of the catalytic converter arrangement 1 to the inner housing 10 of an exhaust gas cleaning device 2.

Figure 3A:
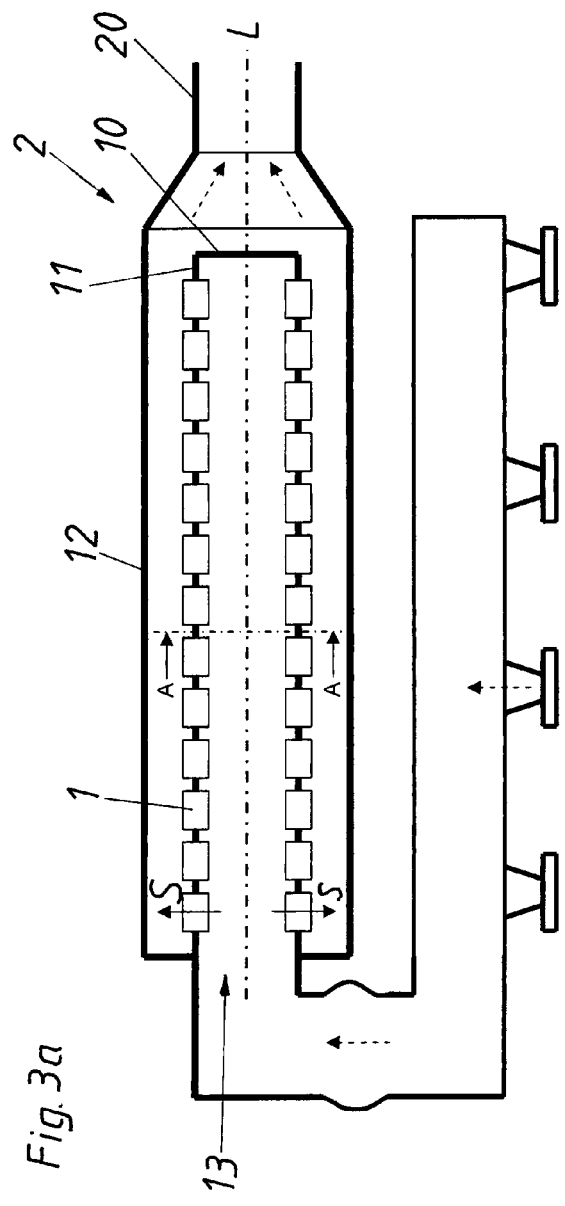
FIG. 3a shows the schematic structure of an exhaust gas cleaning device with exemplary embodiments of the proposed catalytic converter arrangements.

FIG. 3a shows schematically an example of a proposed exhaust gas cleaning device 2 consisting of an inner housing 10 and an outer housing 12 surrounding the inner housing 10. The inner housing 10 is in this connection of tubular shape, and has a housing cover 11 and is closed at the right-hand front side. In the region of the left-hand front side the inner housing 10 is connected to an exhaust gas collecting pipe of an indicated internal combustion engine 3. The flow direction of the exhaust gases from the internal combustion engine 3 is indicated by dashed arrows. Proposed catalytic converter arrangements 1 are disposed along the longitudinal axis L of the inner housing 10 on its housing cover 11. In the illustrated example the exhaust gas flows through the exhaust gas collecting pipe of the internal combustion engine 3 and is introduced through the exhaust gas inlet opening 13 of the inner housing 10 into the interior of the inner housing 10. From here the exhaust gas flows along the flow directions S through the individual catalytic converter arrangements 1 in the direction of the outer housing 12 of the exhaust gas cleaning device 2. From there the exhaust gas leaves the exhaust gas cleaning device 2 via the outlet 20, for example in the direction of the exhaust gas turbocharger.

To monitor the temperature one or more catalytic converter arrangements 1 can be equipped with temperature sensors, wherein these temperature sensors can be disposed directly in front of or after the respective catalytic converter arrangement 1 or also within the catalytic converter arrangement 1—for example between a catalytically active region 4 and a heat absorbing device 5a. Alternatively a heat absorbing device 5a located within a catalytic converter arrangement 1 can also be used to measure the prevailing temperature. By monitoring the temperature the danger of overheating can be detected in good time and suitably counteracted, for example by interrupting the gas feed to the internal combustion engine 3, or by shutting off the exhaust gas via a bypass line 19 (see FIG. 9).

Figure 3B:
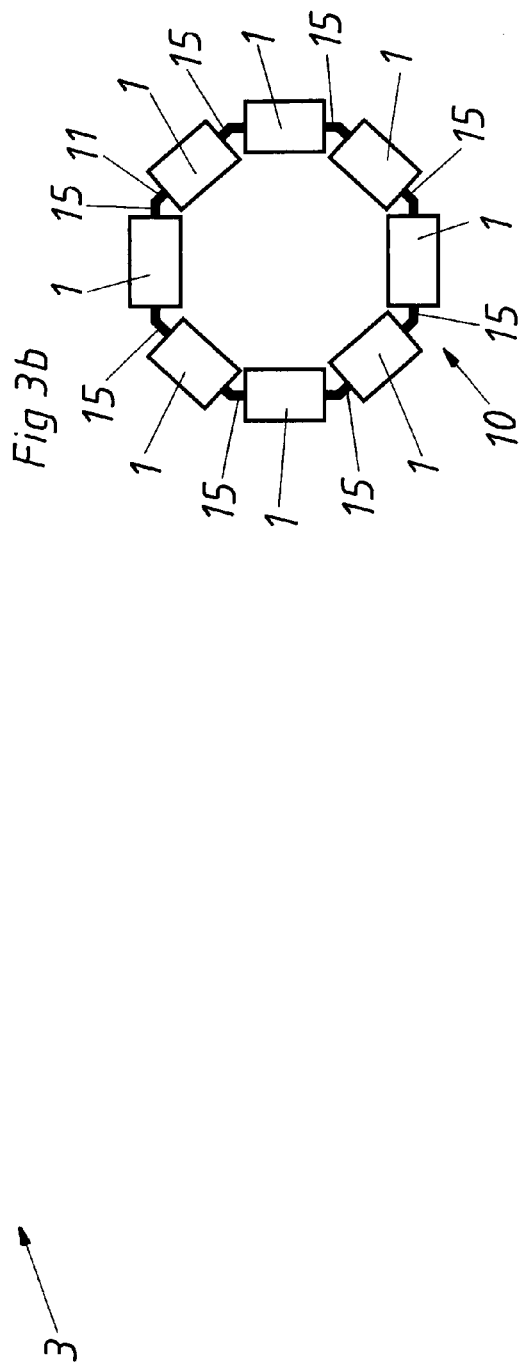
FIG. 3b is a sectional view transverse to the longitudinal axis of the inner housing of the exhaust gas cleaning device according to FIG. 3a, FIG. 4, FIG. 5 show embodiments of various arrangements of the proposed catalytic converter arrangements on an inner housing of an exhaust gas cleaning device.

FIG. 3b shows a sectional view along the sectional line A-A of the inner housing 10 of FIG. 3a. The housing cover 11 of the inner housing 10 is in this connection an eight-edged steel sheet. The catalytic converter arrangements 1 are arranged in the direction of the longitudinal axis L on the eight lateral surfaces 15 of the housing cover 11. A catalytic converter arrangement 1 on a lateral surface 15 can in this connection be fastened via fastening devices 9 projecting from the housing 7 of the catalytic converter arrangement 1 (see FIG. 2).

Figure 4:
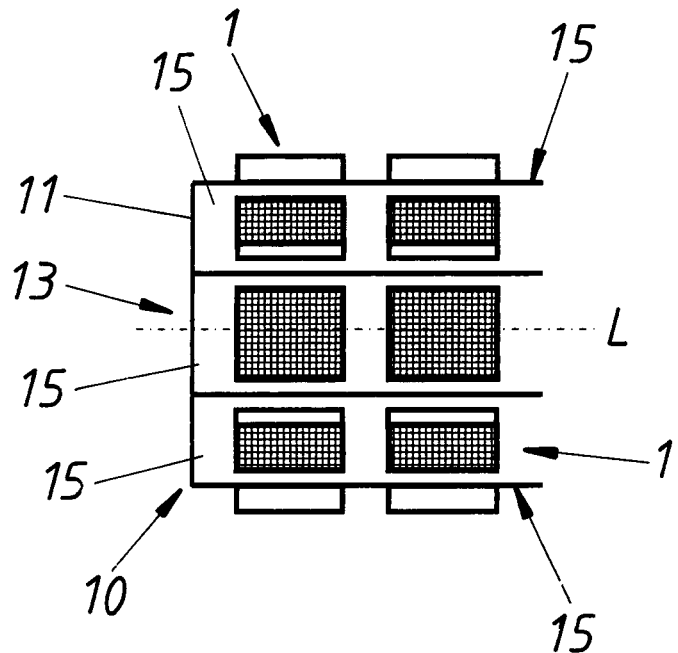

FIG. 4 shows a plan view of a further example of an inner housing 10 with catalytic converter arrangements 1 arranged thereon. The grid-shaped shaded areas indicate the outlet surfaces of a carrier body 6 in the form of a ceramic matrix through which the exhaust gas flows. In this example the catalytic converter arrangements 1 have a rectangular cross-section transverse to the flow direction S. The catalytic converter arrangements 1 of adjacent lateral surfaces 15 of the housing cover 11 are in this connection disposed in each case at the same distance to the exhaust gas inlet opening 13.

Figure 5:
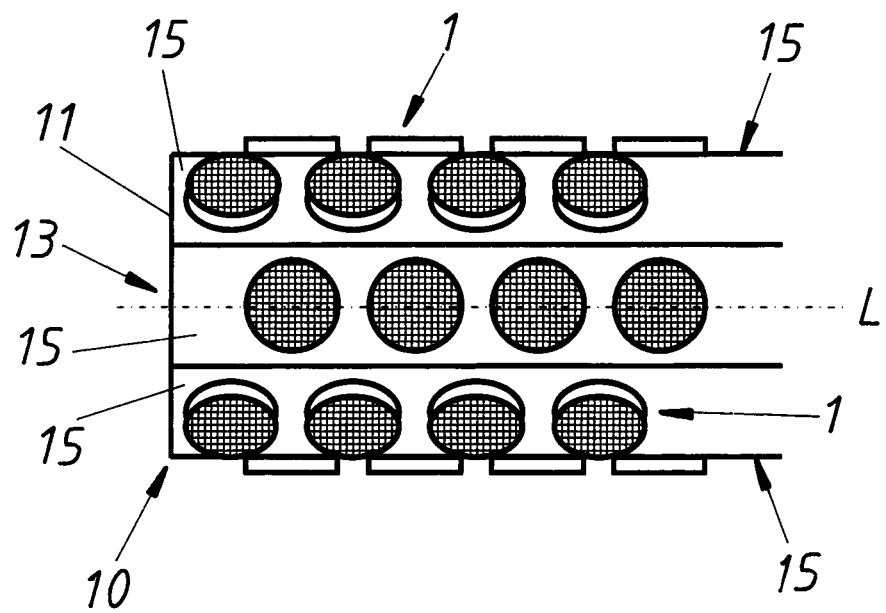

FIG. 5 shows a further example of an inner housing 10 and catalytic converter arrangements 1 arranged thereon. In this example the catalytic converter arrangements 1 have a circular cross-section transverse to the flow direction S. The catalytic converter arrangements 1 of adjacent lateral surfaces 15 of the housing cover 11 are in this case arranged staggered relative to one another. In this way a higher packing density can be achieved. Furthermore the supporting webs between the catalytic converter arrangements 1 can thereby be more uniformly distributed.

Figure 6:
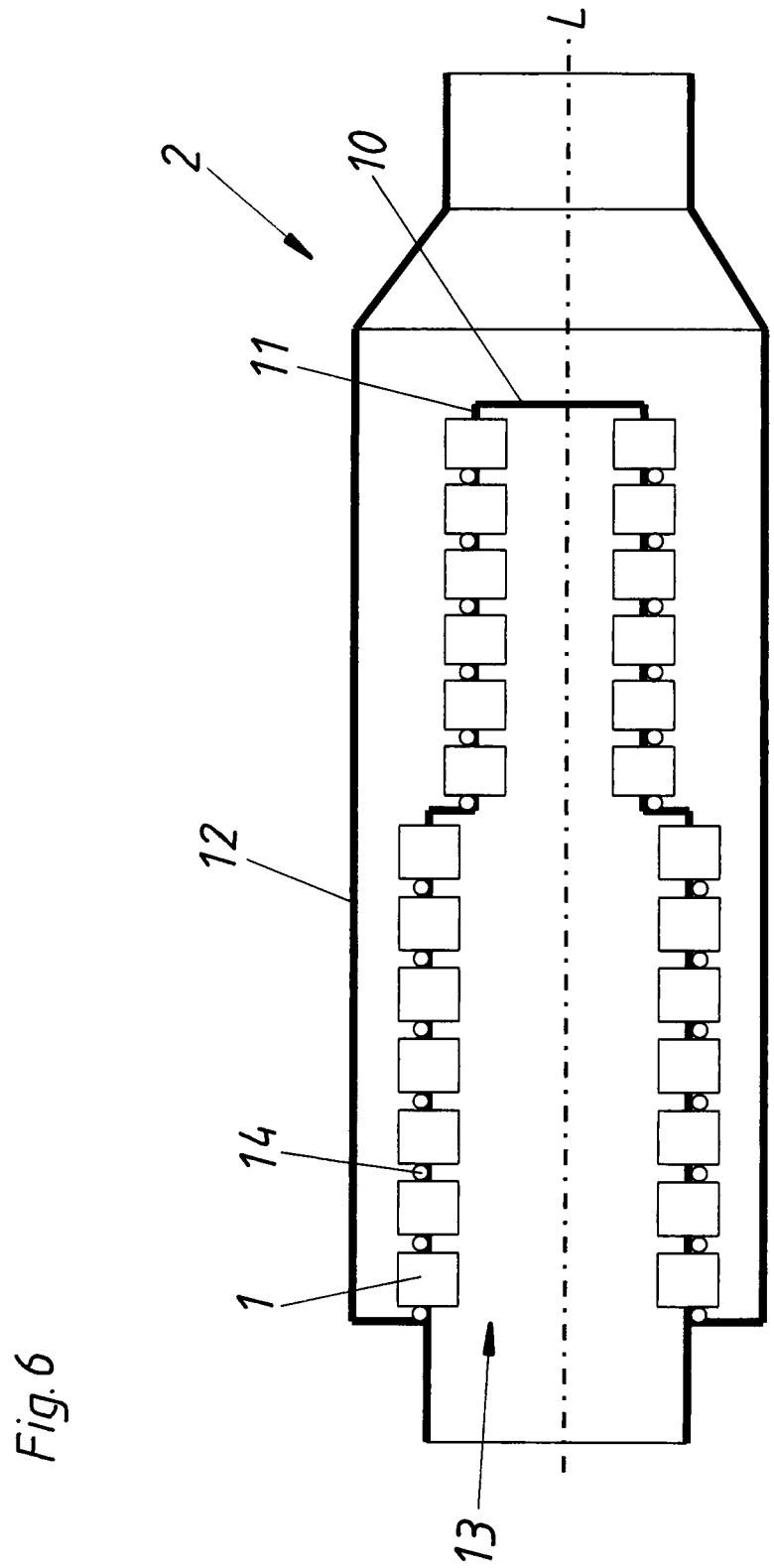
FIG. 6, FIG. 7 are schematic views of further arrangement variants of proposed catalytic converter arrangements in an exhaust gas cleaning device with heating devices.

In order to optimize the flow conditions in an exhaust gas cleaning device 2 the cross-sections of the housing cover 11 of the inner housing 10 along the longitudinal axis L can have several different diameters, and in this way the local exhaust gas volume flows can be adapted. FIG. 6 shows schematically the example of an exhaust gas cleaning device 2 in which the housing cover 11 of the inner housing 10 is step-shaped, wherein the diameter of the cross-section transverse to the longitudinal axis L in the region of the exhaust gas inlet opening 13 has a larger value than the diameter of the cross-section of the housing cover 11 in the region of the closed front side of the inner housing 10. By means of such an alterable flow cross-section of the inner region of the inner housing 10 it can be achieved that the flow velocities of the exhaust gas along the longitudinal axis L have a similar value.

In addition, in this embodiment of the exhaust gas cleaning device 2 heating devices 14 in the form of heating wires are provided between adjacent catalytic converter arrangements 1 in the longitudinal direction L. Due to these heating devices 14 the exhaust gas cleaning device 2 can for example be preheated to the reaction temperature before starting the internal combustion engine 3 (not shown here). In this way in particular the emission behavior during start-up and idling of the internal combustion engine 3 as well as during running up of the internal combustion engine 3 can be improved.

Figure 7:
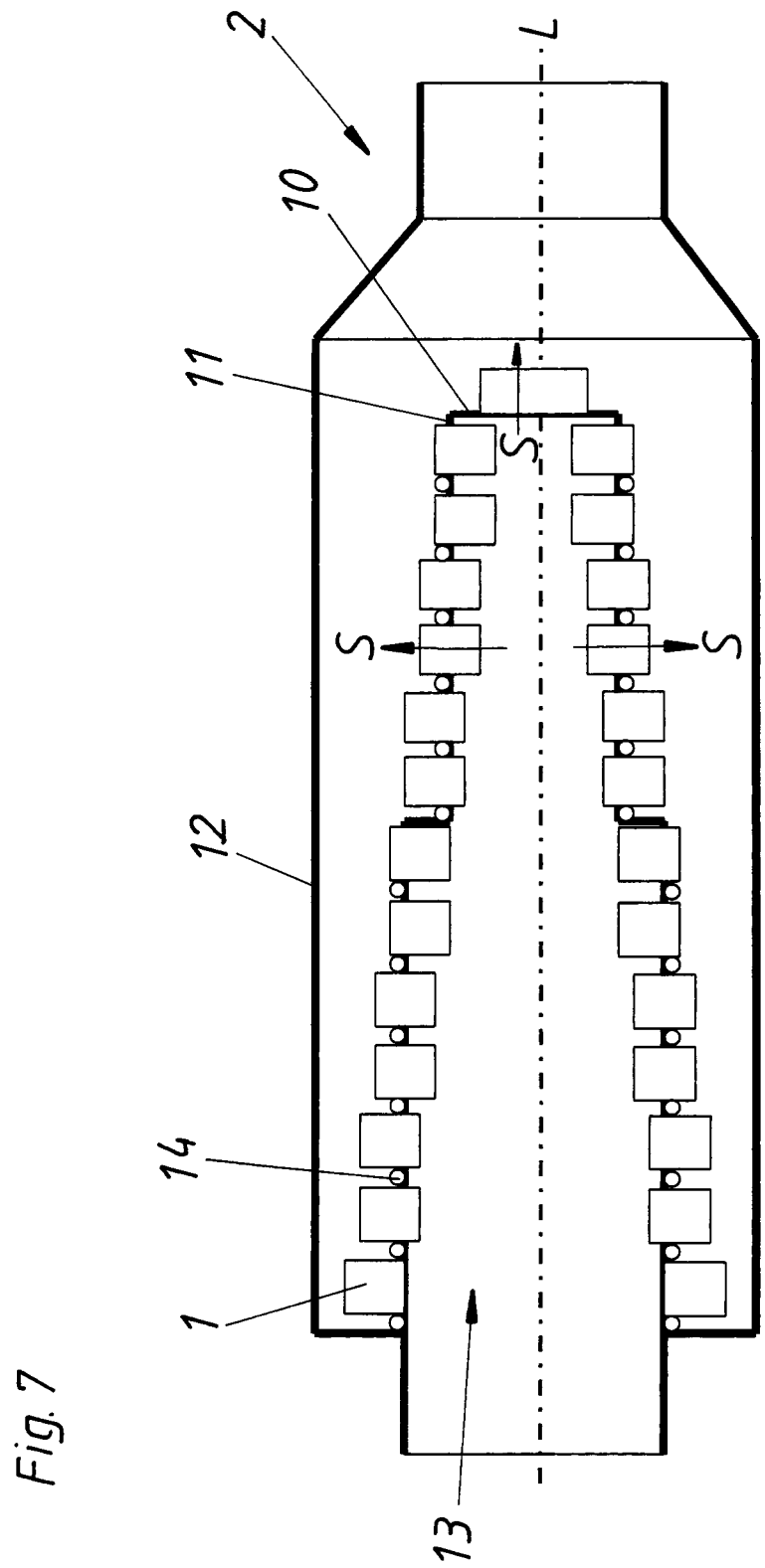

FIG. 7 shows a further example of an exhaust gas cleaning device 2 with the proposed catalytic converter arrangements 1 according to FIG. 6. In addition to the stepped housing cover 11 the catalytic converter arrangements 1 are in this case arranged at different radial distances to the longitudinal axis L, so that the radial distances starting from the exhaust gas inlet opening 13 as far as the right-hand front-side surface of the inner housing 10 continually decrease. This improves the flow conditions of the exhaust gas flow in the interior of the inner housing 10. In this example a further catalytic converter arrangement 1 is provided on the right-hand front side of the inner housing 10, whose flow direction S runs parallel to the longitudinal axis L.

Figure 8:
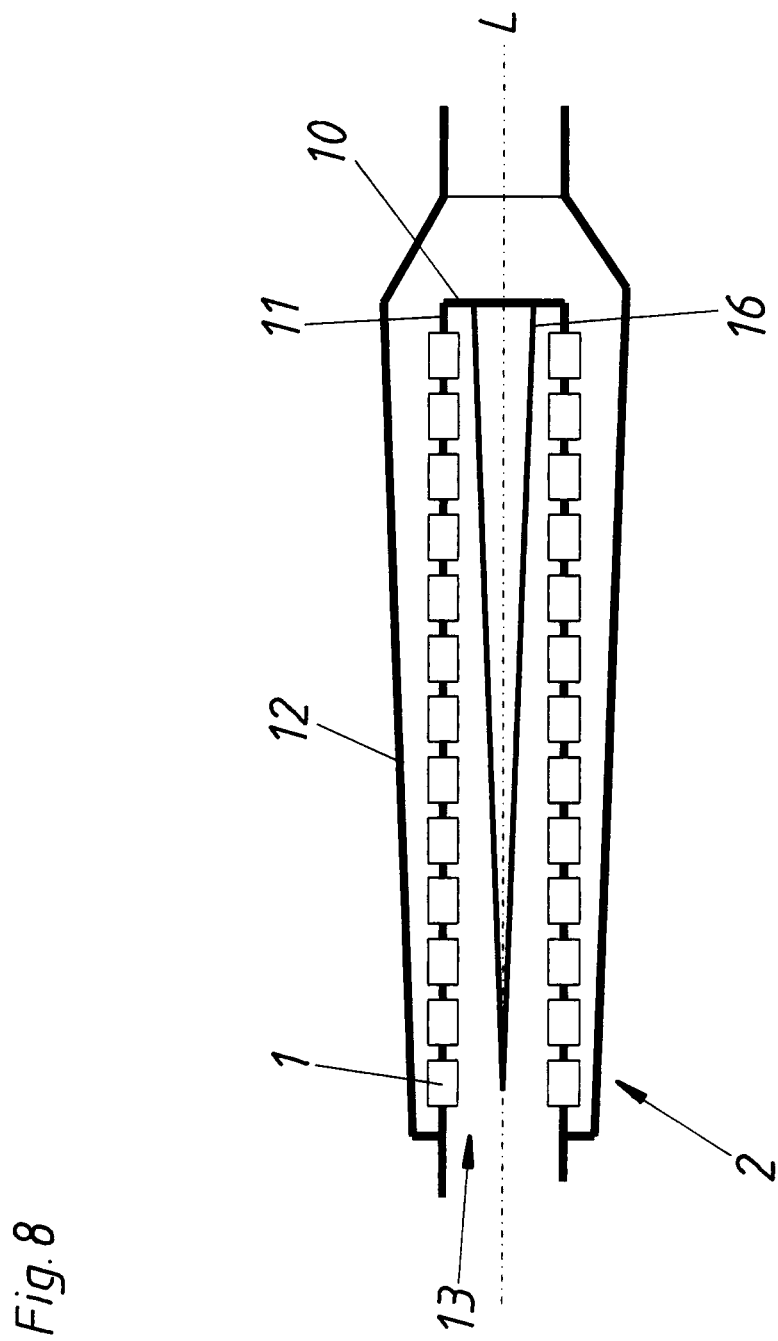
FIG. 8 is a further example of an exhaust gas cleaning device with proposed catalytic converter arrangements.

FIG. 8 shows a schematic longitudinal section of a further advantageous configuration of an exhaust gas cleaning device 2 with proposed catalytic converter arrangements 1, in which a conical flow deflection device 16 is provided in the interior of the inner housing 10. This flow deflection device 16 can improve the flow behavior of the catalytic converter arrangements 1. On the respective outflow side of the catalytic converter arrangements 1 the outer housing 12 is formed in such a way that the distance between the outer housing 12 and housing cover 11 of the inner housing 10 increases from left to right, i.e. in the direction of an increasing mass flow of the exhaust gas flowing through the catalytic converter arrangements 1. Overall this example arrangement according to this embodiment can provide an optimized flow structure, whilst also minimizing the inner space of the exhaust gas cleaning device 2

Figure 9:
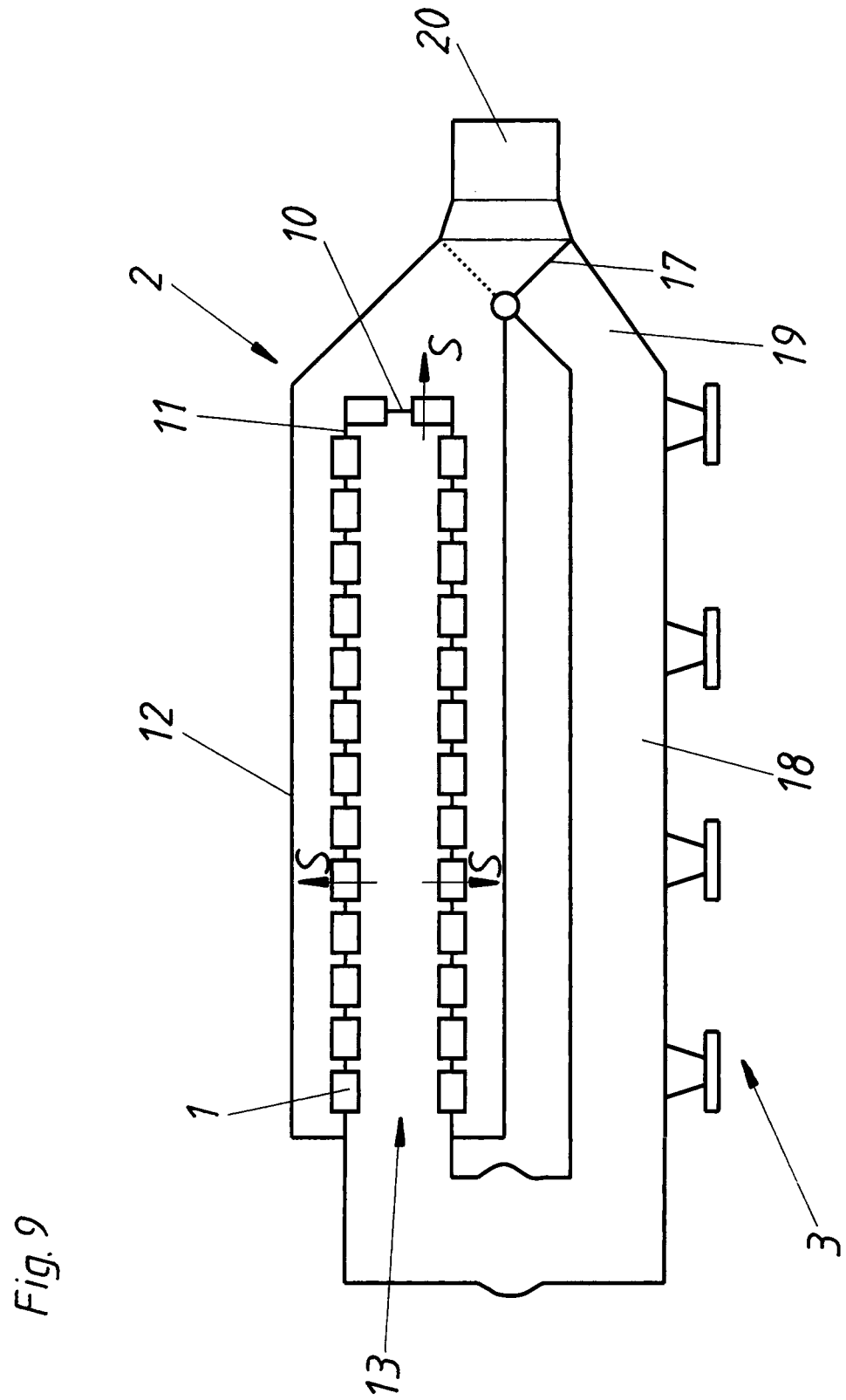
FIG. 9 is a further example of an exhaust gas cleaning device with an adjusting device for influencing the exhaust gas flow.

FIG. 9 shows schematically the internal structure of a further exhaust gas cleaning device 2 with proposed catalytic converter arrangements 1. In the region of the exhaust gas inlet opening 13 of the inner housing 10 the exhaust gas cleaning device 2 is connected to an exhaust gas collecting pipe of an internal combustion engine 3 illustrated here, so that the exhaust gas of the internal combustion engine 3 can flow through the exhaust gas inlet opening 13 into the interior of the inner housing 10. The exhaust gas flows along the flow directions S through the catalytic converter arrangements 1 into the space between the inner housing 10 and outer housing 12. From there the exhaust gas is dissipated via the outlet 20 of the exhaust gas cleaning device 2 for example in the direction of an exhaust gas turbocharger. In this example the exhaust gas collecting pipe 18 of the internal combustion engine 3 is directly connected via a bypass line 19 to the outlet 20 of the exhaust gas cleaning device 2. By means of an exhaust gas deflection device 17 in the form of an adjustment flap the exhaust gas volume stream can be disposed in any relationship between the two conduits, through the exhaust gas cleaning device 2 and through the bypass line 19. A distribution of the exhaust gas volume stream can in this connection be carried out on the basis of the temperature conditions in the exhaust gas cleaning device 2 or corresponding to engine dynamic requirements, for example for the start-up and switch-off of the internal combustion engine 3 or for the rapid running up of the internal combustion engine 3.

The invention claimed is:

1. An exhaust gas cleaning device for an internal combustion engine, comprising catalytic converter arrangements, wherein exhaust gas from the internal combustion engine can flow through the catalytic converter arrangements along a radial flow direction and each of the catalytic converter arrangements contains along the radial flow direction a plurality of catalytically active regions that are mutually independent, wherein a heat dissipation device is provided that comprises at least one heat absorbing device and a heat sink, wherein the at least one heat absorbing device is provided between at least two of the plurality of catalytically active regions, wherein the at least one heat absorbing device is in contact with the heat sink, wherein the exhaust gas cleaning device further comprises an inner housing that is tubular and has a housing cover as well as an outer housing surrounding the inner housing, the inner housing having a longitudinal axis, wherein the catalytic converter arrangements are arranged separately from one another on the housing cover of the inner housing, and wherein each of the catalytic converter arrangements is releasably fastened to the inner housing.

2. The exhaust gas cleaning device according to claim 1, wherein the catalytic converter arrangements are arranged along the longitudinal axis of the inner housing on the housing cover.

3. The exhaust gas cleaning device according to claim 1, wherein the inner housing has an exhaust gas inlet opening, wherein the catalytic converter arrangements are disposed starting from the exhaust gas inlet opening along the longitudinal axis at ever decreasing radial distances from the longitudinal axis.

4. The exhaust gas cleaning device according to claim 1, wherein the housing cover of the inner housing is formed having a polygonal cross section transverse to the longitudinal axis.

5. The exhaust gas cleaning device according to claim 1, wherein a heating device is provided for heating the catalytically active regions of at least one of the catalytic converter arrangements.

6. The exhaust gas cleaning device according to claim 5, wherein, in each case, a heating device is arranged between two adjacent catalytic converter arrangements arranged along the direction of the longitudinal axis.

7. The exhaust gas cleaning device according to claim 1, wherein the plurality of catalytically active regions includes, in each case, a carrier body, wherein at least one catalyst is supported on the carrier body.

8. The exhaust gas cleaning device according to claim 7, wherein at least one catalytic converter arrangement in the radial flow direction has a first catalytically active region and a second catalytically active region, wherein the carrier body of the first catalytically active region has a lower catalyst loading than the carrier body of the second catalytically active region.

9. The exhaust gas cleaning device according to claim 1, wherein the heat absorbing device comprises a material having a good thermal conductivity or a high heat capacity.

10. The exhaust gas cleaning device according to claim 1, wherein the heat absorbing device comprises at least one wire mesh layer.

11. The exhaust gas cleaning device according to claim 1, wherein the heat absorbing device comprises a metal foam or a ceramic foam.

12. The exhaust gas cleaning device according to claim 1, wherein a cooling device is provided for actively cooling the heat absorbing device.

13. The exhaust gas cleaning device according to claim 1, wherein the inner housing is a first housing, the outer housing is a second housing, and each of the catalytic converter arrangements is surrounded by a third housing, wherein the third housing forms the heat sink, wherein a good thermally conducting heat transporting device is provided.

14. The exhaust gas cleaning device according to claim 13, wherein, in each of the catalytic converter arrangements, the third housing comprises at least one fastening device for fastening the respective catalytic converter arrangement to the housing cover of the inner housing.

15. The exhaust gas cleaning device according to claim 13, wherein the good thermally conducting heat transporting device is a metal fiber mat or an embedded mass.

16. The exhaust gas cleaning device according to claim 4, wherein the polygonal cross section is an octagonal cross section.

17. The exhaust gas cleaning device according to claim 1, wherein each of the catalytic converter arrangements is releasably fastened to the inner housing by a screw.

18. The exhaust gas cleaning device according to claim 7, wherein the carrier body is ceramic.

19. The exhaust gas cleaning device according to claim 13, wherein the good thermally conducting heat transporting device is provided between each of the catalytic converter arrangements and the respective third housing.

\* \* \* \* \*